Sept. 24, 1963  J. C. MOODY ETAL  3,104,580
STAPLE FIBER CUTTER

Filed Nov. 22, 1960  2 Sheets-Sheet 1

3,104,580
STAPLE FIBER CUTTER
Jack C. Moody, Nitro, and Leslie Panther, Charleston, W. Va., assignors to American Viscose Corporation, Philadelphia, Pa., a corporation of Delaware
Filed Nov. 22, 1960, Ser. No. 70,989
4 Claims. (Cl. 83—403)

This invention relates to a staple fiber cutting apparatus and more particularly to a cutter of the well-known Beria type such as described in U.S. Patent No. 1,723,998.

In general, the Beria cutter comprises a disk which is rotated at relatively high speed about a vertical axis. The disk has an axial opening which communicates with a radial passageway having an outlet through the peripheral surface of the disk. A tow or bundle of continuous filaments is fed into the axial opening and discharged through the radial passageway due to centrifugal force. One or more blades are stationarily mounted about the periphery of the disk and have cutting edges in contact with the disk so as to sever the tow as it is brought into contact with the blades due to the rotation of the disk. A hard metal bushing is provided at the outlet of the radial passageway so as to provide a long wearing surface to cooperate with the stationary blades in cutting the tow.

This type of cutter is widely used in the synthetic textile industry and is easily adaptable, as by selective positioning of the stationary blades or varying the speed of the disk or the speed at which the tow is fed thereto, to cutting uniform length staple of any desired length or varying length staple. The basic cutter design is generally accepted as sound but the present day use of increased amounts of delustrants, which are of an abrasive nature, increased production rates, shorter staple length, etc. have reduced life of the cutter to the point where cutter life is a limiting factor in the further advance of the art. Specifically, the cutting of delustered filaments at a high production rate has resulted in excessive wear of both the blades and the surface of the rotating disk and has reached the point where extensive overhaul of the cutter is necessary after a few hours or at most a few days of operation in order to maintain the staple length within tolerable limits.

Various means have been proposed, and a number of them patented, for increasing the life of the Beria type cutter without departing from the basic cutter principle. One such proposal has been to mount the stationary blade so that it does not contact the rotating disk itself but only the hardened bushing at the discharge end of the radial passage, the bushing being mounted so as to protrude a small distance beyond the periphery of the disk. This arrangement effectively prevents wear of the disk, but the necessary precise positioning of the cutting edge of the blade is extremely difficult to maintain because of the shock or force exerted on the blade at each cutting of the tow. Another suggested arrangement has been to allow the stationary blade to ride on the periphery of the disk, as in the standard Beria cutter, but to provide means whereby the blade may be shifted vertically, either manually or automatically, so as to bring different portions of the blade into cutting position. This has proven impracticable for several reasons, among them being that it does not eliminate wear of the disk, and, more importantly, the shifting of the blade upsets the natural matching or mating of blade and disk which occurs during "wear in" when the blade is not shifted and results in jamming of the cutter or at best in uneven fiber cutting. Various other proposals have also proven ineffective in substantially increasing cutter life.

It is accordingly an object of the present invention to provide a staple fiber cutter which adheres to the basic principles of the Beria cutter but which will accurately cut various types of staple fibers over a much longer period of time than such cutters as heretofore constructed.

A more specific object of the invention is to provide a Beria type cutter wherein the stationary blade, the rotary disk and the bushing at the end of the radial passage in the disk are formed of specially selected metals which cooperate with one another in such a way as to minimize wear.

A further object of the invention is to provide a cutter of the type referred to wherein the cooperating surfaces of the stationary blade and the disk have special configurations which may either be initially machined thereinto or which are brought about by rapid "wear in" when the device is placed in service.

Other and further objects, features and advantages of the invention will become apparent as the description of a preferred embodiment thereof proceeds.

Referring now to the drawing.

Figure 1:
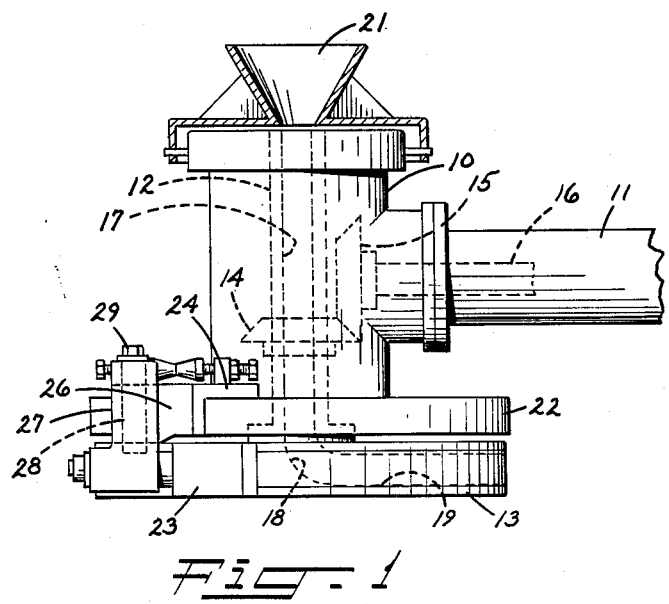
FIGURE 1 is a side elevational view, partially in section, of the apparatus.

Referring first to FIGURE 1, the apparatus includes a housing 10 secured to the free end of a hollow cantilever beam or shaft 11. Mounted within housing 10 in suitable bearings, not shown, is a vertically extending hollow spindle 12 to the lower end of which is secured a disk member 13. A bevel gear 14 is secured to the spindle 12 and meshes with a bevel gear 15 secured to the end of a drive shaft 16 mounted in suitable bearings within the hollow shaft 11.

Figure 3:
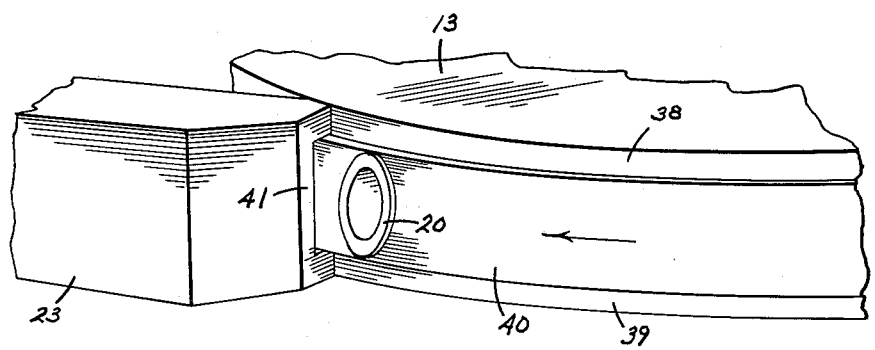
FIGURE 3 is a close-up perspective view showing the relationship and configuration of the engaging surfaces of the rotary disk and the stationary blade.
Figure 4:
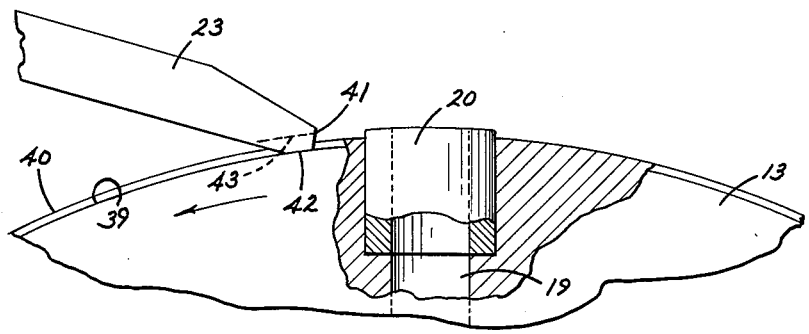
FIGURE 4 is a view showing partially in plan and partially in section the relationship shown in perspective in FIGURE 3.
Figure 5:
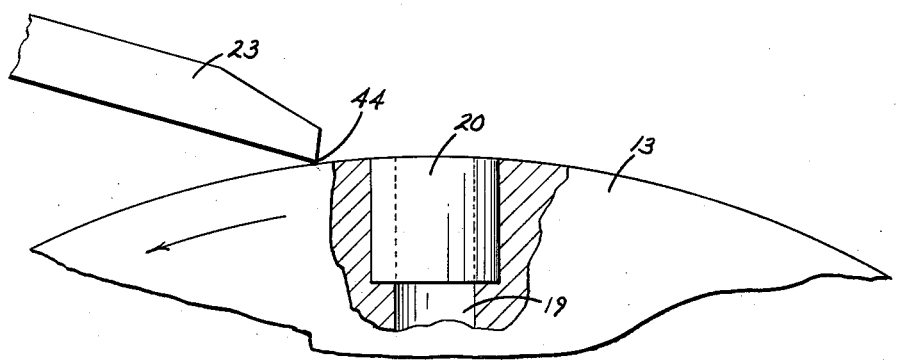
FIGURE 5 is a view similar to FIGURE 4 but showing the parts as they may be originally assembled.

The spindle 12 provides a vertically extending conduit 17 which communicates with an axial opening 18 of disk 13 which in turn is connected with a radial passageway 19 extending to and through the circular periphery of the disk. As best seen in FIGURES 3, 4 and 5, a bushing 20, the purpose of which will later be explained, is mounted in the disk at the outer end of passageway 19. The filamentary bundle or tow which is to be cut into staple fibers is introduced into the apparatus through a funnel 21 and passes downward through conduit 17 into axial opening 18 and is discharged through the radial passageway 19 due to centrifugal force created by rotation of the disk. Movement of the tow through the apparatus may be assisted by introducing water or other liquid into the funnel 21 along with the tow.

Figure 2:
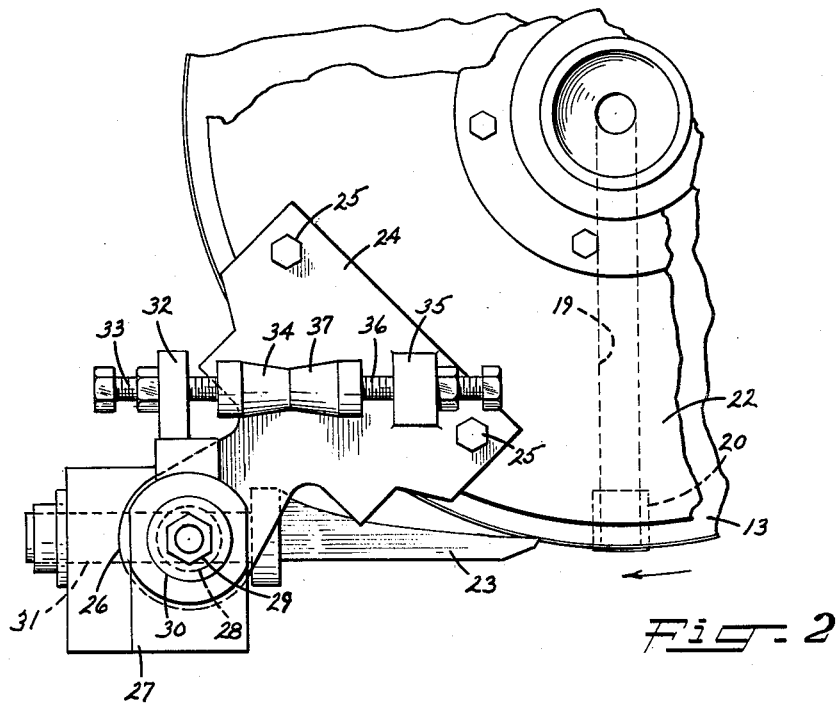
FIGURE 2 is a plan view of a portion of the apparatus showing the mounting of the stationary blade.

Secured to the lower portion of housing 10, or formed integrally therewith, is a plate 22 which, as shown in FIGURE 2, extends to a position adjacent the periphery of rotary disk 13. Plate 22 provides a support for mounting a relatively stationary blade 23 which rides on the periphery of disk 13 and is effective to cut the tow each time the same is brought into contact therewith as the disk rotates.

A bracket 24 is secured to plate 22 by bolts 25 or otherwise and extends beyond the periphery of disk 13 where it is provided with a boss 26. A yoke member 27 has upper and lower legs which fit about boss 26 and a pin 28 extending through said boss and the legs of the yoke provides a pivotal mounting for said yoke member. The upper end of pin 28 is reduced in diameter and threaded to receive a lock nut 29 which together with a washer 30 serves to hold the parts in assembled condition.

Blade 23 is provided with a cylindrical shank 31 by means of which it is secured to and carried by yoke member 27. An edge of blade 23, as will presently be explained in detail, rides on the periphery of disk 13 and the shank of said blade may optionally be connected to yoke member 27 so that no relative movement of any kind is permitted between the blade and the yoke or so that the blade and its shank 31 may be free to rotate about the longitudinal axis of the shank but restrained against any other form of movement relative to said yoke member. The axis of shank 31 is aligned with the cutting edge of blade 23 and said shank is so mounted in yoke member 27 that it intersects the longitudinal axis line of pin 28, although shank 31 extends beneath the lower end of said pin. In the normal Beria type cutter, shank 31 of the blade is mounted outside of pin 28, that is, pin 28 is located between the shank of the blade and the rotating disk 13. With the present arrangement there is a minimum tendency for the blade carrying yoke to be rotated about pin 28 as the tow contacts the blade.

For yieldably holding the edge of the blade against the periphery of the disk the following arrangement is provided. As shown in FIGURE 2, yoke member 27 has extending therefrom an ear 32 through which is screwed an adjustment bolt 33 to one end of which is rotatably secured a resilient bumper 34. A lug 35 extends upwardly from bracket 24 and an adjustment bolt 36 is screwed therethrough. Bolt 36 has rotatably secured thereto a resilient bumper 37 which engages resilient bumper 34. By proper adjustment of bolts 33 and 36, the desired pressure of blade 23 against the disk 13 may be obtained. Lock nuts, as shown, are provided for each bolt to maintain the adjustment.

Normally the force of the tow striking the cutting edge of the stationary blade tends to rotate the blade mounting so that the cutting edge moves away from the surface of the rotary disk, since the force acting longitudinally of the blade acts outside the pivotal mounting. In other words, as previously mentioned, pivot pin 28 is normally located between the disk and the shank 31 of the blade so that the force acting along the length of the blade tends to rotate yoke member 27 in a clockwise direction. With the present arrangement, the force acting lengthwise of the blade passes directly through pivot pin 28 so that it does not tend to rotate the yoke member and, as will be apparent from FIGURE 2, there is a minor component of force as the tow strikes the blade which passes inside of pin 28, that is, between the pin and the disk and this component tends to hold the blade firmly in contact with the periphery of the disk. Thus, in the apparatus shown in the drawing, the blade may be held very lightly against the disk by the resilient bumpers 34 and 37 and this considerably reduces the wear on the parts as opposed to the prior arrangement where the blade had to be held fairly firmly against the disk to prevent it being moved away from the disk during each cut. It should be mentioned that it is necessary to avoid any substantial movement of the blade away from the disk if a clean cut of the tow is to be obtained. However, this particular feature is only a minor factor in the remarkable increased life of the present cutter over those of the prior art.

At its heart, the present invention involves forming disk 13, bushing 20 and blade 23 of specially selected different metals and also involves the configuration of the contacting portions of disk 13 and blade 23, as well as the location of the discharge end of bushing 20 with respect to the periphery of the disk. Before describing these elements and relationships in detail, it is desirable, in order that the distinctive character of the invention may be appreciated, to point out that the factors influencing the phenomenon of wear between two frictionally engaging metals are many. No one property or factor can be used to determine the resistance to wear of one of the metals or the relative amount of wear which will take place between different metals. Certainly the relative hardness of the two metals is an important factor but other factors which must be considered are the toughness, structure and composition of the metals, the rate of oxidation, pressure, speed, temperature, surface finish and others.

Referring now to FIGURES 3 and 4, at least the peripheral surface of disk 13 is preferably formed of bronze although it may be some other alloy of copper or other material recognized as having the properties which make bronze a frequently selected bearing material. The disk may be formed entirely of this material or may be formed mainly of steel with a tire of bronze or the like secured around its periphery. Bronze is not particularly hard, in fact it has a Brinell hardness number between about 60 and 85 but when smooth it provides a good bearing surface which under most conditions of use wears quite well. The periphery of the disk is provided at its edges with depressed track portions 38 and 39 which are highly polished and the central portion 40 of the periphery is as nearly cylindrical as possible, as are tracks 38 and 39, but the central portion need not be highly polished.

As shown, bushing 20 extends a short distance above or beyond the surface of the central portion 40 of the disk. Bushing 20 is formed of an extremely hard metal such as a cemented carbide. Suitable metals or compositions of this type are sold under the trade names of Kennametal, Ramet and Carboloy and have a Brinell hardness number of about 400 or more.

As best seen in FIGURE 3, the width of blade 23 is substantially equal to the thickness of disk 13. The end of the blade is not provided with a knife-like edge as might be expected but instead presents a flat surface 41. The blade contacts the disk only along the track portions 38 and 39 and the side portions of the bottom of the blade are shaped to conform with said track portions. One of these side portions of the bottom of the blade is indicated at 42 in FIGURE 4 and said portions or surfaces are polished so as to slide smoothly over the track portions of the disk. The central portion of the bottom of the blade is cut away to provide a surface 43, see particularly FIGURE 4, which is elevated above and out of contact with the central portion 40 of the disk and precisely aligned with the extremity of bushing 20. Preferably the blade is formed of an erosion resistant, non-ferrous alloy of the class consisting of high nickel-chromium and high cobalt-chromium, such as those sold under the names Illium, Tantung and Stellite. Such alloys have a Brinell hardness number of about 350.

Surface 43 of the blade is so located that the end of bushing 20 just brushes against it during each revolution of the disk. This produces a minute amount of wear between surface 43 and the bushing during each revolution of the disk but during the same revolution a corresponding amount of wear takes place between the tracks 38 and 39 and the mating portions 42 of the blade. Two great advantages are obtained by forming the parts of the metals mentioned above. First, continued operation causes practically no wear of the bushing. The leading edge of the bushing does wear slightly so that it tapers toward the disk but the overall protrusion of the end of the bushing above the surface 40 of the disk remains substantially unchanged after many days of use. Thus the wear between the bushing and the blade is practically entirely effective upon the surface 43 of the blade. Second, the combined wear of the tracks 38 and 39 and the mating surfaces 42 of the blade is slow enough to avoid an unnecessary amount of contact between the bushing and surface 43 of the blade which would result in rapid wear of the surface 43 and fast enough to continuously provide some slight contact whereby a good cutting action is obtained.

Since the factors which are involved in the wear of metals are many, as previously mentioned, the reasons why the present apparatus wears as it does cannot be precisely explained but it is possible to make certain pertinent observations. Thus it is believed that the bushing wears into the blade while receiving only infinitesimal wear itself because the bushing is harder than the blade. It is believed that the tracks 38 and 39 wear very slowly even though the blade is formed of a much harder metal because of the polished cooperating surfaces and because bronze has the qualities which make it a good metal for bearings. Finally, the bearing surfaces of the blade, of which surface 42 is one, wear at substantially the same rate as the tracks, even though the blade is formed of a much harder metal, because the blade surfaces are always in contact with some portion of the track and are continuously receiving wear whereas any particular portion of the track is contacted only once during each revolution of the disk.

When the disk, bushing and blade are formed of the particular metals mentioned above, it is not necessary to initially machine the parts to the configurations shown in FIGURES 3 and 4. The parts may be formed as shown in FIGURE 5 and after a brief period of operation they will "wear in" to the desired configurations. As shown in FIGURE 5, the periphery of the disk is flat, that is the central portion is the same distance from the axis of the disk as the edges and there are no tracks 38 and 39. The outer end of the bushing is flush with the periphery of the disk and the blade has an edge 44 which contacts the entire width of disk periphery. Because of the relatively sharp edge 44, the blade quickly wears into the entire surface of the disk leaving the much harder bushing 20 protruding above the disk. Then, as the disk continues to rotate, the protruding bushing begins to wear into the central portion of the blade, leaving only the outer or edge portions of the blade in contact with the disk. These edge portions gradually become flattened or curved to conform to the curvature of the disk and they also wear into the edge portions of the disk so as to form the tracks 38 and 39. When the bushing begins to wear away the central portion of the blade, there is never again any contact between the blade and the central portion of the disk. In other words, after the initial wearing away of a small amount of the entire periphery of the disk and the subsequent slight wear of the central portion of the blade, only the outer bottom edges of the blade remain in contact with the disk. As the contacting portions of the blade become more and more worn away they increase in area and this increased area of contact reduces the unit force between the blade and the disk and causes the wear between blade and disk to proceed at a slower rate. Thus the longer the apparatus is in operation, the slower becomes the rate of wear.

Thus it will be seen that the present invention provides an arrangement whereby the stationary blade is in continuous and steady contact with the rotating disk but the cutting edge of the blade is out of contact with the disk and precisely alinged with the hardened bushing through which the tow is discharged. Since the cutting edge or portion of the blade is out of contact with the disk, the only wear of this portion of the blade is produced by its periodic contact with the bushing and consequently the life of the blade is considerably prolonged.

In the drawings, particularly in FIGURES 3 and 4, the distance between the surface 40 of the disk and the end of the bushing, as well as the corresponding distance between surface 40 of the disk and surface 43 of the blade, has been considerably exaggerated for the purpose of illustration. Actually the bushing protrudes only a few thousandths of an inch, this being sufficient to keep surface 43 of the blade entirely free of contact with the surface 40 of the disk.

Having thus described the invention, what is claimed is:

1. An apparatus for cutting filamentary material into staple fibers comprising a rotatably mounted circular disk formed of brass, a radial passageway through said disk through which filamentary material is adapted to be ejected as said disk rotates, said passageway having a discharge end opening through the central portion of the periphery of the disk, a cemented carbide bushing mounted in said disk about the discharge end of said passageway, said bushing having an outside diameter which is less than the thickness of said disk and an outer end flush with the periphery thereof, a relatively stationary blade pivotally mounted adjacent the periphery of said disk, said blade being formed of an erosion resistant, non-ferrous alloy of the class consisting of high nickel-chromium and high cobalt-chromium, said blade having a relatively sharp edge of substantially the same width as the periphery of the disk, and resilient means urging said blade so as to engage the relatively sharp edge thereof with the periphery of said disk.

2. An apparatus for cutting filamentary material into staple fibers comprising a rotatably mounted circular disk, the periphery of said disk having a central portion and track-forming side portions, said central portion being located at a greater distance from the axis of said disk than said track-forming side portions, a radial passageway through said disk through which filamentary material is adapted to be ejected as said disk rotates, said passageway having a discharge end opening through the central portion of the periphery of the disk, a hard metal bushing mounted in said disk at the discharge end of said passageway, said bushing being elevated above the central portion of the disk periphery, a relatively stationary blade pivotally mounted adjacent the periphery of said disk, said blade having an end having portions engaged with the track-forming side portions of the periphery of said disk and said end having another portion spaced from the central portion of the disk periphery and aligned with the end of said bushing so that it makes contact with said bushing each time the disk rotates, and resilient means urging the end of said blade against said disk.

3. The apparatus set forth in claim 2 wherein said bushing and said blade are formed of metals such that the contact between the bushing and the blade produces wear of the blade without substantial wear of the bushing.

4. The apparatus set forth in claim 2 wherein said disk is formed of brass, said bushing is formed of a cemented carbide, and said blade is formed of an erosion resistant, non-ferrous alloy of the class consisting of high nickel-chromium and high cobalt-chromium.

References Cited in the file of this patent

UNITED STATES PATENTS

| 85,085 | Golding | Dec. 22, 1868 |
|---|---|---|
| 1,952,388 | Simons | Mar. 27, 1934 |
| 2,450,496 | Whiteley | Oct. 5, 1948 |
| 2,581,470 | Dooley | Jan. 8, 1952 |
| 2,620,993 | Jeffrey | Dec. 9, 1952 |
| 2,631,667 | Schmitz | Mar. 17, 1955 |
| 2,745,490 | Steiger | May 15, 1956 |
| 2,823,969 | Traver | Feb. 18, 1958 |
| 2,949,151 | Goldstein | Aug. 16, 1960 |
| 2,984,139 | Smith et al. | May 16, 1961 |

FOREIGN PATENTS

| 108,585 | Austria | Jan. 10, 1928 |